Patented Nov. 1, 1949

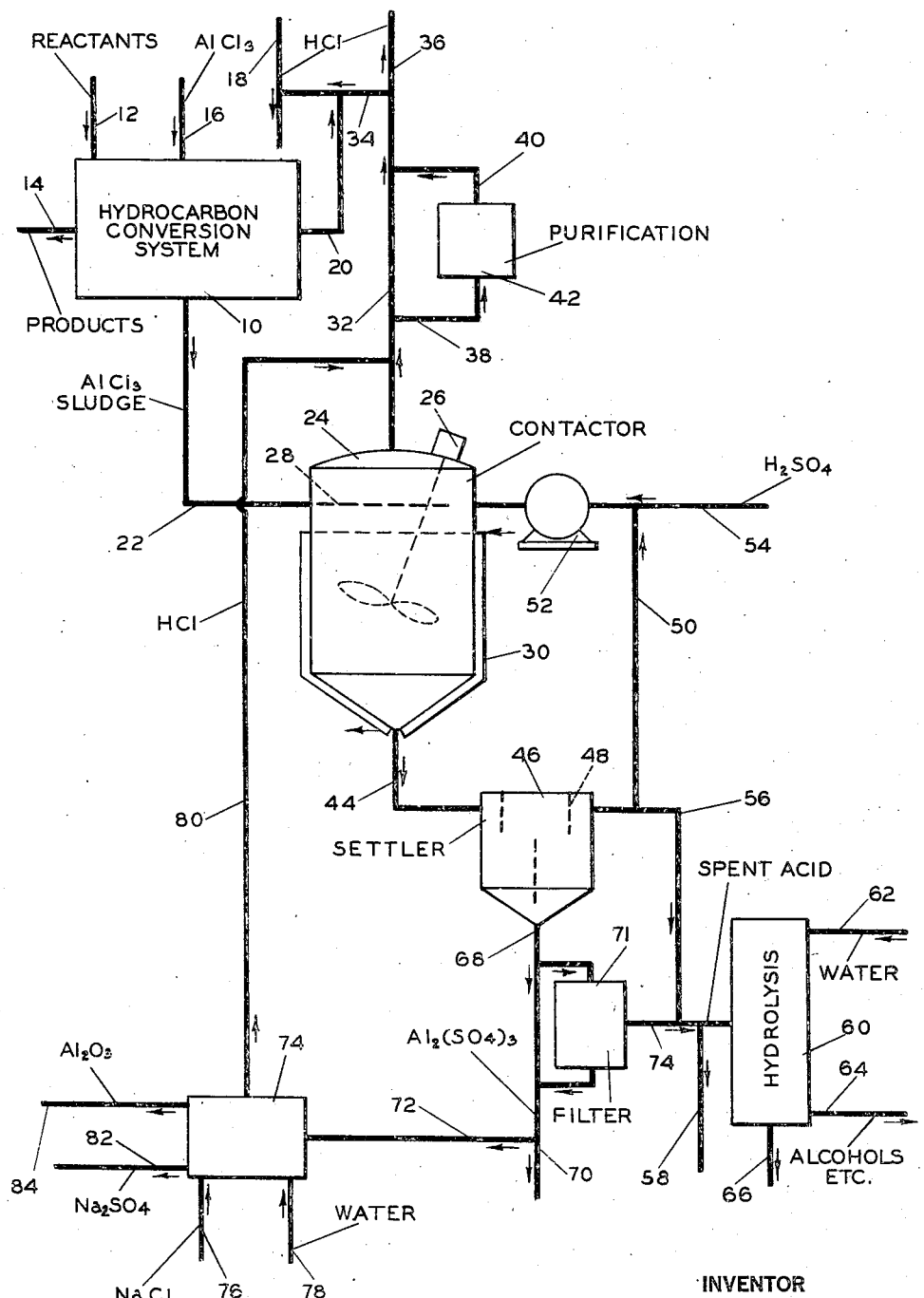

2,486,484

UNITED STATES PATENT OFFICE 2,486,484

TREATMENT OF METAL HALIDE SLUDGE

John W. Latchum, Jr., Bartlesville, Okla., assignor to Phillips Petroleum Company, a corporation of Delaware Application December 30, 1943, Serial No. 516,318

8 Claims. (Cl. 23—154)

This invention relates to the treatment of metal halide sludges to recover valuable components thereof. The invention also relates to the production of hydrogen halides. A particular modification of the invention relates to the treatment of aluminum chloride-hydrocarbon sludges to form anhydrous hydrogen chloride. Features of the invention are especially applicable to hydrocarbon or other organic conversions carried out with the aid of Friedel-Crafts type metal halide catalysts activated by hydrogen halides.

Of great commercial interest at the present time are the isomerization and alkylation of low-boiling hydrocarbons, particularly members of the paraffin series such as the butanes, pentanes and hexanes. In these reactions a simple chemical change is effected under relatively mild conditions. In the case of isomerization a change in carbon skeleton without change in number of carbon atoms occurs, and in the case of alkylation the direct union of two molecules, such as an isoparaffin and an olefin, occurs to produce a higher molecular weight hydrocarbon. These reactions are known to be catalyzed to a greater or less extent by the so-called Friedel-Crafts type metal halide catalysts, among the better known of which may be mentioned aluminum chloride, aluminum bromide, boron fluoride, zinc chloride, ferric chloride, antimony trifluoride, zirconium tetrachloride, and other polyvalent metal halides, generally used in anhydrous form. Aluminum chloride has to date received the greatest commercial acceptance due to its activity, relatively low cost, and availability. Such metal halide catalysts are also utilized to a great extent in a relatively large number of other reactions involving hydrocarbons and other organic materials, and such uses are now well known to the art.

In most cases the metal halide catalysts, as exemplified by aluminum chloride, are advantageously, and sometimes necessarily, activated with the corresponding anhydrous hydrogen halide or with other materials which provide the hydrogen halide under the conditions of reaction. The quantity of hydrogen halide required varies greatly in accordance with the reaction being catalyzed and may range from less than one per cent of the metal halide up to much larger quantities, such as 50 to 100 per cent. The hydrogen halides, being normally gaseous or highly volatile liquids, frequently are lost from the reaction system by leaks or by incorporation in various effluent streams, as well as by reacting with components of the reaction mixture, and such losses in many cases represent a substantial proportion of the chemical cost in a commercial plant.

In organic reactions utilizing anhydrous aluminum chloride or the like, the aluminum chloride may be charged to the process either as a solid, or as a slurry formed by dissolving and/or suspending a considerable amount of aluminum chloride in hydrocarbons or other suitable liquids. In any case a liquid sludge is formed after a short period of operation, the rate usually being more rapid when reactants are in liquid phase, and the sludge, which at the outset is active as a catalyst, gradually becomes deactivated with use. Such sludges may comprise complexes of aluminum chloride with hydrocarbons or other organic materials, as well as dissolved or suspended free aluminum chloride. In a process in which a sludge-forming catalyst is utilized a portion of the sludge must be periodically or continuously withdrawn and replaced with fresh aluminum chloride in order to maintain an economic level of catalytic activity. The utilization of such sludge to avoid wasting its aluminum chloride content would be of appreciable economic advantage and would also simplify the problems of sludge disposal. However, in spite of the obvious need for recovering such aluminum chloride, it has heretofore been customary to discard the sludge as waste material. Although a number of processes have been proposed for utilizing partially spent catalyst to effect further reactions or to recover valuable components, various drawbacks have prevented such processes from being brought into commercially active use.

It is an object of this invention to recover valuable components from metal halide sludges. A further object is to treat liquid sludges comprising Friedel-Crafts type metal halides in free and/or combined form in a simple but effective manner in order to recover the halogen content thereof. An additional object is to carry out organic conversions, and particularly hydrocarbon isomerizations and alkylations, in the presence of an aluminum halide catalyst, and to treat sludges derived therefrom to provide make-up hydrogen halide activator for said catalyst. Another object of the invention is to recover organic constituents from sludges of the type described in the form of useful products. Another object of this invention is to manufacture substantially pure hydrogen chloride. A further object is to treat such sludge to recover hydrogen halides and metal salts, and to treat so-recovered metal salts to form additional hydrogen halide. Further objects and advantages of the invention will be apparent, to one skilled in the art, from the accompanying disclosure and description.

Briefly stated, my invention broadly contemplates withdrawal of metal halide sludge from contact with reactants and treating the same with a strong, relatively non-volatile mineral acid, for example sulfuric acid or an oxygen-containing acid of phosphorus, the acid preferably being in large excess of the sludge. Substantially pure anhydrous hydrogen halide is withdrawn in vapor form from the acid and passed to desired utilization; preferably at least part of the hydrogen halide so formed is used as activator in the conversion. In further preferred specific modification the invention provides for the recovery of aluminum sulfate, aluminum phosphate, or the like from the body of acid and reaction of the same with an alkali or alkaline earth metal halide and water to provide additional hydrogen halide. As another advantageous step in my process I may recover acid from contact with sludge and hydrolyze same to recover valuable high molecular weight alcohols and other organic components. For the sake of convenience, I shall describe a specific embodiment of my invention with particular reference to hydrocarbon conversions in which a sludge-type aluminum chloride catalyst activated with hydrogen chloride is employed or formed. Application of the invention to other organic reactions using aluminum chloride or other Friedel-Crafts type metal halide catalysts in the form of sludges or under conditions forming sludges, may readily be made with suitable modifications in view of the teachings of this disclosure. Merely by way of example may be mentioned the formation of alkyl phenols by the reaction of phenol with tertiary alkyl halides or alcohols.

Referring now to the accompanying drawing and the following description thereof, the drawing shows in diagrammatic form one preferred arrangement of equipment and flow of materials therethrough which may be employed in the practice of the invention. It will be appreciated that the representation is schematic in nature, and that many auxiliary elements such as pumps, valves, heaters, coolers, catalyst chambers, fractionators, control equipment, and the like will readily be supplied by one skilled in the art, once given the description of principles and specific methods of operating provided herein. It will be further appreciated that various modifications of the process may be practised without departing from the spirit and scope of the invention.

In the drawing, a hydrocarbon conversion system is represented diagrammatically by the rectangle 10. The particular equipment and conditions required of course largely depend upon the conversion being effected, and may be any of those known to the art. It is to be understood that all necessary steps for recovery of products, recycle of unconverted material, etc., are deemed to be included in the system 10. One or more reactants may be supplied through line 12, and one or more products are recovered through line 14. Aluminum chloride catalyst may be supplied through line 16 in desired form, and hydrogen chloride in catalyst-activating amounts may enter through line 18. Frequently a substantial proportion of the activator is recovered by fractionation or otherwise from reactor effluents and may be recycled through line 20 for reuse. Aluminum chloride sludge is withdrawn intermittently or continuously through line 22 and passed to contactor 24 which contains a large body of sulfuric acid. Alternatively, though usually less desirably due to cost, orthophosphoric or other acid of phosphorus may be employed. Contactor 24 is provided with a stirring device 26 which maintains the liquid contents in an agitated condition. The sludge from line 22 may be introduced at any point, but preferably at the top of the body of acid, by means of a distributing ring or other device 28. A steam jacket 30 or other means may be used to maintain contactor 24 at an elevated temperature if desired. The sludge reacts very rapidly with the acid and substantially pure hydrogen chloride is evolved and removed continuously or intermittently through line 32. At least a portion of the hydrogen chloride is passed by lines 34 and 18 into conversion system 10 as catalyst activator. Any excess produced represents a valuable chemical and is recovered through line 36 for use as desired. Under some conditions of operation the hydrogen chloride may require purification, in which case part or all may be passed by lines 38 and 40 through a purifying zone 42.

Aluminum sulfate is formed in contactor 24 and precipitates as a very finely divided solid suspended in the liquid reaction mixture. Contactor 24 may be so constructed as to allow a partial settling of the aluminum sulfate. In many cases a suspension of aluminum sulfate in sulfuric acid is withdrawn from the bottom of contactor 24 through line 44 at a rate substantially equivalent to that at which it is formed. This suspension is passed through settling zone 46, which may be provided with baffles 48. Acid with a decreased solids content is recycled via line 50 and pump 52 to the contactor. Fresh acid sufficient for the reaction is supplied by line 54. A portion of the acid is intermittently or continuously bled off through line 56 and may be discharged through line 58 if desired. Preferably, however, this "spent" acid is passed to a hydrolyzing zone 60. Therein it is contacted with water introduced through line 62, and a non-aqueous oily liquid layer is formed and separated through line 64 from a dilute acid layer, which is removed through line 66. A high proportion of the organic content of the aluminum chloride sludge appears in the non-aqueous layer, largely in the form of high molecular weight alcohols. A limited amount of sulfonates is also formed and may be recovered from both layers. The alcohols formed by this hydrolysis have molecular weights lying largely within the range of 100 to 400 and are valuable for use as solvents or in other processes known to the art. It will be seen that by operating in this manner valuable products are obtained from the sludge which would otherwise not be recoverable.

Aluminum sulfate is recovered from settler 46 through line 68 and may be removed from the system through line 70. This aluminum sulfate will be mixed with a small amount of spent sulfuric acid and such acid may be recovered in filter or other suitable means 71 and passed by line 74 to admixture with spent acid being removed through line 56. In some cases the separate removal of acid through line 56 will not be required, if the amount withdrawn through line 68 in admixture with aluminum sulfate is adequate to maintain the desired strength of acid in the reaction system. Aluminum sulfate recovered by the methods described may be advantageously utilized in such a manner as to provide additional hydrogen chloride as a product of the process, which may be used as additional catalyst activator if required. To this end aluminum sulfate is conveyed by line 72 to zone 74. Here it is mixed with sodium chloride, potassium chloride, calcium chloride, or other alkali metal or alkaline earth metal halide introduced through line 76, and water introduced through line 78, in the approximate amounts required by the equation

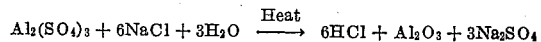

$$Al_2(SO_4)_3 + 6NaCl + 3H_2O \xrightarrow{Heat} 6HCl + Al_2O_3 + 3Na_2SO_4$$

The aluminum sulfate passed to this step may be previously freed of sulfuric acid or may retain some acid in admixture therewith, in which latter case an additional amount of sodium chloride equivalent to the free acid is supplied. By heating to a moderate temperature, such as 200 to 500° F., substantially pure hydrogen chloride is almost quantitatively evolved. This hydrogen chloride may be passed by line 80 to line 32 for addition to the hydrogen chloride formed in contactor 24. Limited amounts of sulfur oxides may in some cases contaminate the hydrogen chloride in line 80. Such impurities may be removed in unit 42. As by-products of the last-described hydrogen chloride-producing reaction, sodium sulfate may be recovered through line 82 and aluminum oxide may be recovered through line 84. In the event that an excess of hydrogen chloride is produced by the process described, such an excess may advantageously be reacted with the aluminum oxide formed in unit 74 to provide make-up aluminum chloride catalyst for use in the conversion. Such reaction may be directly between the hydrogen chloride and aluminum oxide, as by passing the former over the latter in admixture with carbon at a temperature of about 1800° F., or the hydrogen chloride may be oxidized by the Deacon process to form elementary chlorine which is then reacted with aluminum oxide and carbon at high temperature in known manner to form aluminum chloride. In this manner a substantially complete recovery of the aluminum chloride and hydrogen chloride introduced into conversion system 10 is realized.

Metal halide sludge treated by the process of by invention may contain almost any proportion of metal halide. In ordinary practice when hydrocarbons are undergoing conversion, the sludge will usually contain from about 25 to about 75 per cent metal halide by weight in free and/or combined form. This sludge is reacted with sulfuric acid at any temperature between the freezing point and boiling point of the acid. Substantially atmospheric temperatures may conveniently be used. The higher temperatures effect a more complete recovery of aluminum chloride from sludge, and a temperature range of about 100 to about 400° F. is preferred. For example, in treating the sludge obtained from an aluminum chloride isomerization of normal butane, contact with 97% sulfuric acid at 150° F. effected reaction of 98% of the aluminum chloride, while contact at 200° F. under otherwise similar conditions caused the reaction of 100% of the aluminum chloride content of the sludge. Although the rate of reaction is very rapid, it is generally more convenient to provide a large excess of acid in the sludge-acid contacting zone, and to add the sludge to the acid. If the reverse procedure is used a hard crust tends to form on the surface of the body of sludge which impedes access of further amounts of acid to the sludge. It is ordinarily quite satisfactory to start the reaction with sulfuric acid of 96 to 97% concentration. The reaction may be carried out as a batch process or as a continuous process as is most expedient for a given plant. As the reaction proceeds, sulfuric acid is used up in forming hydrogen chloride and aluminum sulfate, as well as in forming esters, sulfonates and the like with the organic residue of the sludge. The acid may be used successfully down to a fairly low titratable acidity. Generally I prefer to fortify the acid before it drops to a titratable acidity below about 50 per cent. The water content of the acid may increase to 15 per cent or more without affecting the reaction rate to an undesirable extent. Acid having a water content of greater than about 15 per cent is less desirable in that substantial amounts of water begin to appear in the otherwise-anhydrous hydrogen halide when such acid is used. Aluminum sulfate is highly hygroscopic and tends to remove water from the reaction zone as water of crystallization. Accordingly, the using up of acid which occurs does not cause as great dilution as might otherwise be encountered. After being used a short time the sulfuric acid takes on a dark brown or blackish color, but is found to be still active for the purpose of reacting with the sludge.

The only impurity found to a substantial extent in the hydrogen chloride produced by the process of my invention is sulfur dioxide. Quantities which are ordinarily considered negligible are formed at temperatures up to 200 to 250° F. and even at 300° F. and higher. The sulfur dioxide content of the hydrogen chloride in any case seldom exceeds a few per cent, and is ordinarily well below one per cent. In some conversions the presence of minor amounts of sulfur dioxide is not objectionable; in other instances the sulfur dioxide is preferably removed from the hydrogen chloride prior to introducing the latter into the conversion system as catalyst activator. The removal may be accomplished in unit 42 by any suitable means, but preferably by counter-currently scrubbing the hydrogen chloride gas with sulfuric acid as disclosed, and claimed in my copending application Serial Number 516,885, filed January 3, 1944, now Patent No. 2,416,011. Very minor amounts of light hydrocarbon gases, hydrogen, and carbon dioxide may also be present in the hydrogen chloride as impurities, depending upon the type of sludge treated, the strength of acid used, and reaction conditions. Such materials are ordinarily not deleterious, but may if necessary be removed in any suitable manner. Preferably when the hydrocarbon or other organic conversion in system 10 is carried out under pressure, contactor 24 is also held under pressure so that the hydrogen chloride or other hydrogen halide may be pressured to a suitable point in the conversion or separation system.

In the event that phosphoric acid or other non-volatile mineral acid is used, similar reaction conditions are generally suitable except for the fact that a somewhat more elevated temperature is usually required for maintaining the reaction at a practical rate. Accordingly, when using orthophosphoric acid, I prefer to operate at a temperature of about 130° F. or higher. Of course sulfur oxides are not found as contaminants in the hydrogen chloride formed by the reaction of sludge with phosphorus acids.

The following data are offered to show results obtainable in the practice of my invention as applied to certain conversion processes. Inasmuch as many other applications will be evident to one skilled in the art, it is to be understood that the examples are merely illustrative and are not to be construed as unduly limiting the scope of the invention.

*Example I*

In a butane isomerization process in which normal butane is isomerized to isobutane with a solid aluminum chloride catalyst using hydrogen chloride as activator, 182 pounds of sludge per day was formed. This sludge had an aluminum chloride content of 70 per cent by weight. This sludge was continuously passed from a sludge accumulator into a sulfuric acid reaction tank containing 95% sulfuric acid. The reactor was maintained at 150° F. and hydrogen chloride gas was produced at the rate of 100 pounds per day. This amount of hydrogen chloride was slightly more than adequate to provide makeup hydrogen chloride to the isomerization system. The contactor was maintained at a pressure slightly below that maintained in the catalyst chamber so that sludge passed into it without pumping. The gaseous hydrogen chloride produced was easily pressured into the fractionation section of the plant at a point at which the pressure was lower than that held in the contactor so that it was unnecessary to pump the hydrogen chloride stream. This stream was sufficiently pure to allow its use in the system without further treatment and represented a recovery of 98% of the chlorine content of the sludge, including small amounts of free hydrogen chloride dissolved or occluded in the sludge and released by the acid treatment. Most of the organic material formed by reaction of the sludge with the acid was soluble in the acid, and was recoverable therefrom by hydrolysis of the spent acid.

*Example II*

A plant in which isobutane is alkylated with ethylene, produces 66,000 gallons per day of 7 pound Reid vapor pressure alkylate predominating in diisopropyl. A sludge-type aluminum chloride catalyst activated with hydrogen chloride is used. The fresh sludge is made up from powdered commercial aluminum chloride and heavy alkylate. This sludge catalyst is added to the system as required to maintain optimum catalytic activity. Sludge is withdrawn from the catalyst stream at the rate of 9100 pounds per day, and has an aluminum chloride content of 55% by weight. This sludge is reacted with sulfuric acid in a contactor similar to that shown in the drawing. The contactor is held at 175° F. and the acid maintained at a titratable acidity of 80%. Hydrogen chloride is produced at the rate of 3900 pounds per day, and is purified by a countercurrent scrubbing with commercial sulfuric acid. Acid from this scrubbing is used as make-up acid to the sludge reaction. Two thousand pounds per day of the hydrogen chloride is used as make-up activator in the diisopropyl plant, and the remainder comprises pure hydrogen chloride which is valuable for use in other processes.

While my invention has been described with particular reference to butane isomerization and to isobutane alkylation in which aluminum chloride and hydrogen chloride are used in catalytic combination, the principles thereof may be readily applied by one skilled in the art to various other hydrocarbon or other organic conversions in which metal halide sludges are used or formed.

I claim:
1. A process for the production of a hydrogen halide which comprises contacting a Friedel-Crafts type metal halide-organic sludge, spent as a catalyst in an organic reaction, with a strong, relatively non-volatile mineral acid, recovering hydrogen halide so-formed, recovering a metal salt formed by reaction of said Friedel-Crafts type metal halide sludge with said acid, reacting so-recovered metal salt with water and a halide chosen from the group consisting of alkali metal and alkaline earth metal halides, and recovering additional hydrogen halide so formed.

2. The process of claim 1 in which said strong mineral acid is sulfuric acid.

3. The process of claim 1 in which said strong mineral acid is phosphoric acid.

4. The process of claim 1 in which said halide is a chloride.

5. A process for the production of a hydrogen halide which comprises contacting a Friedel-Crafts type metal halide-organic sludge, spent as a catalyst in an organic reaction, with a strong, relatively non-volatile mineral acid at a temperature within the range of 100–400° F., recovering hydrogen halide so-formed, recovering a metal salt formed by reaction of said Friedel-Crafts type metal halide sludge with said acid, reacting so-recovered metal salt with water and a halide chosen from the group consisting of alkali metal and alkaline earth metal halides at a temperature within the range of 200–500° F., and recovering additional hydrogen halide so-formed.

6. A process for the production of a hydrogen halide which comprises adding a Friedel-Crafts type metal halide-organic sludge, spent as a catalyst in an organic reaction, to an excess of a strong, relatively non-volatile mineral acid, recovering hydrogen halide so-formed, recovering a metal salt formed by reaction of said Friedel-Crafts type metal halide sludge with said acid, reacting so-recovered metal salt with water and a halide chosen from the group consisting of alkali metal and alkaline earth metal halides, and recovering additional hydrogen halide so-formed.

7. The process of claim 1 in which said Friedel-Crafts type metal halide is aluminum chloride.

8. The process of claim 5 in which said Friedel-Crafts type metal halide is aluminum chloride, in which said strong mineral acid is sulfuric acid, in which an aluminum sulfate as said metal salt is reacted with water and sodium chloride as said halide, and in which hydrogen chloride is produced as said hydrogen halide.

JOHN W. LATCHUM, JR.

REFERENCES CITED

The following references are of record in the file of this patent:

UNITED STATES PATENTS

| Number | Name | Date |
| --- | --- | --- |
| 1,277,329 | McAfee | Aug. 27, 1918 |
| 1,865,797 | Schiffler | July 5, 1932 |
| 2,331,429 | Sensel et al. | Oct. 12, 1943 |
| 2,365,917 | Thomas | Dec. 26, 1944 |

OTHER REFERENCES

Babor et al., "General College Chemistry," Thomas Y. Crowell Co., N. Y. (1940), page 319.